United States Patent
LaBarge et al.

(10) Patent No.: US 6,852,200 B2
(45) Date of Patent: Feb. 8, 2005

(54) NON-THERMAL PLASMA REACTOR GAS TREATMENT SYSTEM

(75) Inventors: William J. LaBarge, Bay City, MI (US); Mark Hemingway, Columbiaville, MI (US); Joachim Kupe, Davisburg, MI (US); Haskell Simpkins, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 326 days.

(21) Appl. No.: 10/076,361

(22) Filed: Feb. 14, 2002

(65) Prior Publication Data

US 2003/0150709 A1 Aug. 14, 2003

(51) Int. Cl.$^7$ .............................. C01B 21/00; B01J 19/08
(52) U.S. Cl. ...................... 204/177; 204/164; 204/173; 204/174; 422/186.04
(58) Field of Search ................................ 204/164, 170, 204/171, 173, 174, 177; 422/186.04

(56) References Cited

U.S. PATENT DOCUMENTS

| | | | |
|---|---|---|---|
| 5,891,409 A | * | 4/1999 | Hsiao et al. ............. 423/239.1 |
| 6,338,827 B1 | | 1/2002 | Nelson et al. ........... 422/186.04 |
| 6,354,903 B1 | | 3/2002 | Nelson ........................ 445/58 |
| 6,357,223 B1 | * | 3/2002 | Caren et al. .................. 60/274 |
| 6,368,451 B1 | | 4/2002 | Goulette et al. ........ 174/152 R |
| 6,423,190 B2 | | 7/2002 | Hemingway et al. ....... 204/164 |
| 6,464,945 B1 | | 10/2002 | Hemingway ................ 422/174 |
| 6,482,368 B2 | | 11/2002 | Hemingway et al. .. 422/186.04 |
| 6,537,507 B2 | | 3/2003 | Nelson et al. .............. 422/186 |
| 6,638,484 B2 | | 10/2003 | Nelson et al. ........... 422/186.04 |

FOREIGN PATENT DOCUMENTS

JP   2000-140642   *   5/2000

OTHER PUBLICATIONS

Machine Translation of Japanese Patent 2000–140642.*

* cited by examiner

*Primary Examiner*—Rodney G. McDonald
(74) *Attorney, Agent, or Firm*—Jimmy L. Funke

(57) ABSTRACT

A gas treatment system and method for using the same is disclosed. The gas treatment system, comprises: a non-thermal plasma reactor; and a catalyst composition disposed within said non-thermal plasma reactor, said catalyst composition comprising a $MZr_4(PO_4)_6$, wherein M is a metal selected from the group consisting of platinum, palladium, ruthenium, silver, rhodium, osmium, iridium, and combinations comprising at least one of said foregoing metals. The process comprises exposing said gas to a plasma field and to the catalyst composition.

24 Claims, 1 Drawing Sheet

GLOW DISCHARGE

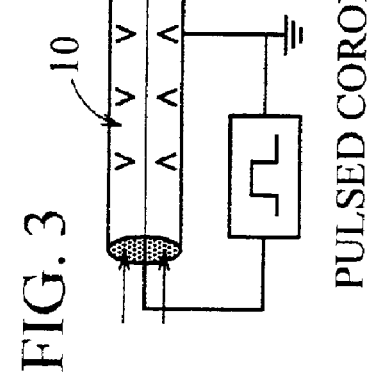
FIG. 3
PULSED CORONA
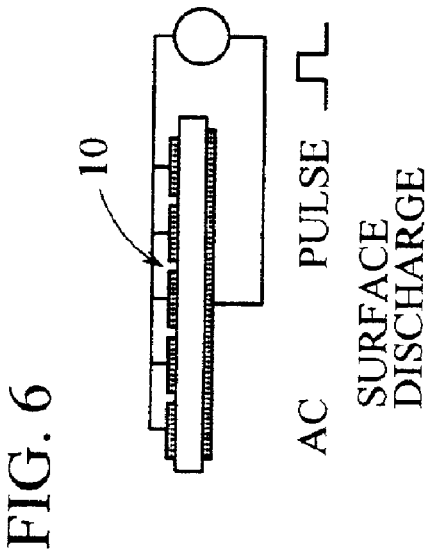
FIG. 6
AC PULSE
SURFACE DISCHARGE
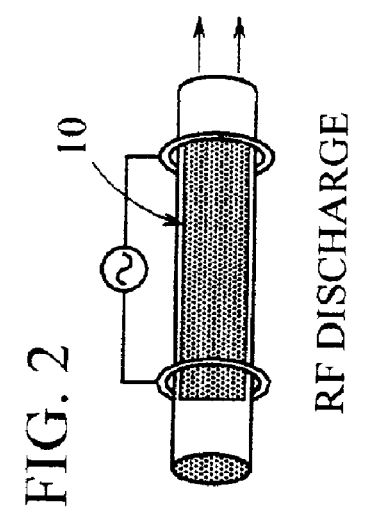
FIG. 2
RF DISCHARGE
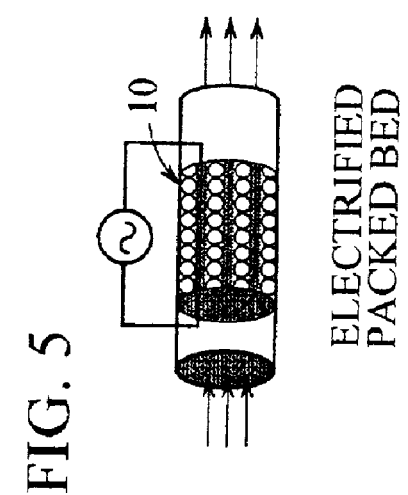
FIG. 5
ELECTRIFIED PACKED BED
FIG. 1
GLOW DISCHARGE
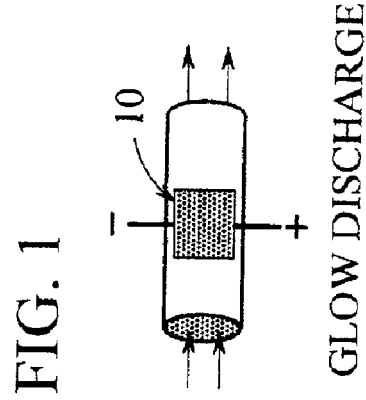
FIG. 4
SILENT DISCHARGE (DIELECTRIC-BARRIER DISCHARGE)

NON-THERMAL PLASMA REACTOR GAS TREATMENT SYSTEM

BACKGROUND OF THE INVENTION

Internal combustion engines produce large amounts of exhaust gases consisting primarily of carbon dioxide ($CO_2$), water, unburned hydrocarbons (HCs), carbon monoxide (CO) and oxides of nitrogen ($NO_X$). Since the 1970's the emission of unburned HCs, CO and $NO_X$ has been regulated and the world-wide regulatory climate for reducing exhaust gases has become ever more stringent. For example, the Clean Air Act Amendment of 1990 mandates that emission generating industrial plants develop and/or implement techniques to significantly reduce their emissions of $NO_X$. Such legislation affects power plants, iron and steel plants, pulp and paper mills, acid production plants, petroleum refineries, lime plants, fuel conversion plants, glass fiber processing plants, charcoal production plants, cement plants, copper smelters, coal cleaning plants, etc. $NO_X$ are primary contributors to photochemical smog and acid rain, and may deplete the ozone layer.

As a result, many present day engines, especially gasoline-fueled engines used for passenger automobiles and the like, operate very near stoichiometric conditions, where catalyst technology that allows simultaneous abatement of unburned HCs, CO, and $NO_X$, is well advanced. There is a desire to introduce diesels and gasoline lean-burn vehicles on a broader basis because of their significant fuel economy advantages with attendant lower fuel costs. These vehicles operate with a ratio of air to fuel in the combustion mixture supplied to the engine that is maintained above the stoichiometric ratio so that the resulting exhaust gases are "lean," i.e., the exhaust gases are relatively high in oxygen content and relatively low in reductants content, e.g., HC, CO, and/or hydrogen (H).

Although lean burn engines provide enhanced fuel economy, they have the disadvantage that conventional three-way catalysts (TWC) cannot adequately abate the $NO_X$ component of the pollutants in the gas stream. A number of approaches have been investigated in an attempt to solve this problem. One approach disclosed in JP 8281116 A2 to Shinji et al., is the use of zirconium phosphate in combination with at least one type of $NO_X$ storing material. However, in this approach $NO_X$ is stored and not chemically altered to $NO_2$ or $N_2$.

In another approach numerous research agencies have investigated the use of non-thermal plasma devices ("NTPDs") in processes that reduce $NO_X$ in gas streams. These techniques use exogenous reducing agents, such as ammonia ($NH_3$), methane ($CH_4$), or carbon monoxide (CO), or neutralizing agents, such as calcium hydroxide ($Ca(OH)_2$). The techniques have utility; however, they are accomplished with relatively low efficiency levels.

In a third approach a two-stage process for reducing $NO_X$ emission has been investigated. The first stage plasma converts $NO_X$ to $NO_2$ in the presence of oxygen and a catalyst. In the second stage $NO_2$ in the presence of HC and/or carbon soot particles will be converted to $N_2$ and $CO_2$, as disclosed in U.S. Pat. No. 6,038,854. However, in this approach the efficacy of the $NO_X$ to $NO_2$ conversion is low.

Considerable research is currently underway toward the development of catalysts that are capable of decomposing or reducing the amount of $NO_X$ in emissions under oxidizing conditions. For example, U.S. Pat. No. 6,139,694 to Rogers et al. discloses a process wherein injection of ethanol into a non-thermal plasma reactor in the presence of exhaust gas will significantly enhance the efficiency of the $NO_X$ to $NO_2$ oxidation.

Much of this research focuses on using hydrocarbons in engine exhaust to reduce oxides of nitrogen under lean conditions. Interestingly, reacting NO with HC will result in limited $N_2$ production, however reacting $NO_2$ with HC will result in 70–80% production of $N_2$ as a result the $NO_X/NO_2$ emissions are decreased.

SUMMARY

Disclosed herein is a gas treatment system and a process for treating gas. The gas treatment system comprises: a non-thermal plasma reactor; and a catalyst composition disposed within said non-thermal plasma reactor, said catalyst composition comprising a $MZr_4(PO_4)_6$, wherein M is a metal selected from the group consisting of platinum, palladium, ruthenium, silver, rhodium, osmium, iridium, and combinations comprising at least one of said foregoing metals.

A process for treating gas, comprises: exposing said gas to a plasma field; and exposing said gas to a catalyst composition comprising $MZr_4(PO_4)_6$, where M is a metal selected from the group consisting of platinum, palladium, ruthenium, rhodium, osmium, silver, iridium, and alloys and combinations comprising at least one of said foregoing metals.

The above described and other features are exemplified by the following figures and detailed description.

BRIEF DESCRIPTION OF THE DRAWING

Referring now to the figures wherein the like elements are numbered alike:

FIG. 1 illustrates a glow discharge non-thermal plasma reactor;

FIG. 2 illustrates a RF discharge non-thermal plasma reactor;

FIG. 3 illustrates a pulsed corona non-thermal plasma reactor;

FIG. 4 illustrates a silent discharge non-thermal plasma reactor;

FIG. 5 illustrates an electrified packed bed non-thermal plasma reactor; and

FIG. 6 illustrates a surface discharge non-thermal plasma reactor.

DESCRIPTION OF THE PREFERRED EMBODIMENT

The exhaust gas system herein concerns a non-thermal plasma reactor and a catalyst composition. Not to be limited by theory, the catalyst composition contained within the non-thermal plasma reactor disclosed herein is believed to employ a two stage chemical phenomena that will result in reduction in the amount of $NO_X$ in emission gas. Exposing emission gas containing $NO_X$ to the catalyst composition in the presence of a non-thermal plasma reactor will result in the efficient and efficacious oxidation of $NO_X$ to form $NO_2$, stage 1. Further reaction of $NO_2$ with HC and/or carbon soot particles will result in oxidation of the HC and/or carbon soot and reduction of $NO_2$ to form a benign gas containing $CO_2$ and $N_2$ and possibly water ($H_2O$), stage 2, wherein the net effect will be a reduction in the amount of $NO_X$ in the emission gas.

Exhaust gasses passing through the plasma will be ionized, and some will be converted NO to $NO_2$. This process, however, is not efficient, and a significant amount of NO will remain in the gas stream. NO will not react to any significant extent with HC and as a result NO emissions will not be reduced. The use of a catalyst composition contained within a non-thermal plasma reactor will result in an efficient and efficacious oxidation of NO to $NO_2$, stage 1. It is believed that, in the presence of HC and/or carbon soot particles, the $NO_2$ will react to produce significant amounts of $N_2$ as a result decreasing the amount of $NO_X$ in the emission gas, stage 2 (Scheme I).

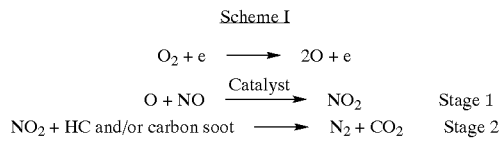

Scheme I

This process enables the removal of greater than or equal to about 66% of the nitrogen oxides in the gas stream, with greater than or equal to about 78% preferred, and greater than or equal to about 90% especially preferred.

The catalyst composition preferably comprises a metal zirconium phosphate ($MZr_4(PO_4)_6$) and, optionally, an oxidation catalyst. The catalyst composition can comprise up to about 100 weight percent (wt %) $MZr_4(PO_4)_6$ and up to about 50 wt % oxidation catalyst, with greater than or equal to about 70 wt % $MZr_4(PO_4)_6$ and greater than or equal to about 0.25 wt % oxidation catalyst preferred, greater than or equal to about 80 wt % $MZr_4(PO_4)_6$ and greater than or equal to about 1 wt % oxidation catalyst more preferred, and greater than or equal to about 2 wt % oxidation catalyst even more preferred, based on the total weight of the catalyst composition. It is further preferred to employ less than or equal to about 99 wt % $MZr_4(PO_4)_6$ and less than or equal to about 30 wt % oxidation catalyst, with less than or equal to about 98 wt % $MZr_4(PO_4)_6$ and less than or equal to about 20 wt % oxidation catalyst more preferred, based on the total weight of the catalyst composition. This catalyst composition may be wash coated, imbibed, impregnated, physisorbed, chemisorbed, precipitated, or otherwise applied to or disposed on beads, plates, walls, or the like within the non-thermal plasma reactor.

For the metal-zirconium phosphate ($MZr_4(PO_4)_6$), the metal ("M") can comprise a metal such as platinum (Pt), palladium (Pd), ruthenium (Ru), rhodium (Rh), silver (Ag), osmium (Os), and iridium (Ir), as well as combinations comprising at least one of the foregoing metals. For example, the metal zirconium phosphate can be: $PtZr_4(PO_4)_6$, $PdZr_4(PO_4)_6$, $RhZr_4(PO_4)_6$, $IrZr4(PO_4)_6$, $RuZr_4(PO_4)_6$, $(Ag/Pd)Zr_4(PO_4)_6$, $AgZr_4(PO_4)_6$, $PtTiZr_3(PO_4)_6$, and the like, as well as combinations comprising at least one of the foregoing phosphates.

In addition to the $MZr_4(PO_4)_6$, the gas treatment system can optionally comprise an oxidation catalyst. This oxidation catalyst can be combined with the catalyst composition as a mixture or such that a gas with contact the oxidation catalyst subsequent to contacting the $MZr_4(PO_4)_6$. Alternatively, the oxidation catalyst ca be disposed downstream, in fluid communication with the non-thermal plasma reactor. Possible oxidation catalysts comprise metals such as platinum (Pt), palladium (Pd), ruthenium (Ru), rhodium (Rh), osmium (Os), iridium (Ir), gold (Au), copper (Cu), silver (Ag), aluminum (Al), gallium (Ga), indium (In), tin (Sn), titanium (Ti), and other metals, as well as oxides, alloys, salts, and mixtures comprising at least one of the foregoing metals. Examples include catalytically effective amounts of $Pt/Al_2O_3$, Pt/Au, Pt/Rh alloys and mixtures, oxidized Cu, oxidized Ag, $Ga_2O_3$, $In_2O_3$, $Al_2O_3$, and $SnO_2$, and others dispersed on supports including, but not limited to, cordierite, ceramic, zeolite, alumina, alumina sponges, porous glasses, as well as mixtures comprising at least one of the foregoing supports, which exist in multiple forms such as a monolith, beads, plates, and the like. More preferably, the oxidation catalyst is a sulfur dioxide ($SO_2$)-tolerant silver oxide catalyst. Still more preferably, the catalyst comprises a catalytic metal component comprising a crystalline aluminosilicate zeolite loaded with a metal. Preferred metals for this purpose include copper and silver. Examples of such catalysts are described in U.S. Pat. Nos. 5,908,806 and 5,891,409, which are hereby incorporated by reference.

The catalyst(s) are preferably disposed within a non-thermal plasma reactor. The non-thermal plasma reactor can be any non-thermal plasma reactor, such as a glow discharge reactor, RF discharge reactor, pulsed corona reactor, dielectric-barrier discharge reactor, electrified packed bed reactor, surface discharge reactor, and the like, with a pulse corona reactor preferred. (See FIGS. 1–6 where 10 represents the catalyst composition.)

During use, the non-thermal plasma reactor, which is connected to a power supply, is capable of generating a non-thermal plasma. The plasma generated has a mixture of reactive free radicals, ions, and electrons that cause the ionization of exhaust gasses, as well as neutral species. In a non-thermal plasma, the electron mean energy is much higher than the ion and gas mean energies. A non-thermal plasma can be generated by a number of methods, including electrical fields, electron beams, irradiation with electromagnetic energy of appropriate intensity and wavelength, and the like.

Non-thermal plasmas for treatment of exhaust of internal combustion engines are preferably generated by electrical fields. In this type of generation, the plasma is generated by using a high voltage electrical field that approaches the breakdown voltage for the gas and gap geometry, usually about 20 kilovolts per centimeter (KV/cm) or so, where a local dissociation of electrons results. The electrons accelerate rapidly in the electrical field, striking and ionizing other molecules. The path of ionized molecules and electrons is called the streamer. If the voltage is stopped before or shortly after the streamer crosses the gas gap causing an arc discharge, then a non-thermal plasma of ions and free electrons is formed.

When the plasma reactor is a corona discharge reactor, the electrical field may be designed to be non-uniform. For example, a small wire can be disposed along the length of the reactor. The electrical field will then be very strong at the wire, but fall off rapidly with increasing distance from the wire and extinguishing before reaching the wall of the reactor, preventing formation of an arc. Alternatively, arc formation can be prevented by supplying a pulsed voltage.

In a dielectric barrier reactor, one or both electrodes are coated with a dielectric barrier. In this case, the streamer is extinguished on the surface of the dielectric material.

Packed bed plasma reactors are particularly preferred. In a packed bed reactor, the volume between the electrodes is packed with a dielectric material, for example, with beads. The electrical field is concentrated at the point of contact of the beads because of the difference in dielectric constants of the bead material and the gas.

The dielectric material of the non-thermal plasma reactors can be partially or wholly coated with the catalyst composition as described above. The packing can be a material such as zirconia, alumina, titanium, a ceramic, or the like, as well as mixtures comprising at least one of the foregoing materials. For example, the plasma reactor can be a reactor packed with zirconia beads and/or alumina beads that have been first coated with gamma-alumina and then impregnated with the catalyst composition. This maximizes the adsorbent surface to which the exhaust stream will be exposed.

Preferably, the plasma reactor is operated for a sufficient period of time to consume a minimal fraction of the engine energy consumption, with an energy consumption of about 3% or less preferred. The amount of energy consumption for the plasma reactor depends upon the particular type and geometry of reactor as well as the length of time it is operated to convert the $NO_X$, which is in turn dependent upon such factors as the size and efficiency of the catalytic converter. These factors can easily be controlled and optimized by person of ordinary skill in the art. For a spark ignition engine run under lean conditions, the energy needed to operate the plasma reactor is estimated at about 1% to about 3% of the engine energy consumption.

Optionally, a catalytic converter can be disposed in fluid communication with the non-thermal plasma reactor wherein at least a portion, and preferably all of the exhaust from the non-thermal plasma reactor passes through the catalytic converter. The catalytic converter can comprise various three-way catalysts and/or catalysts capable of reducing hydrocarbon and/or carbon monoxide emissions. Some possible catalysts include those described above as oxidation catalysts.

EXAMPLES

Example 1

81.9 grams zirconium oxynitrate and 244.7 grams of 14.0 wt % platinum ammine nitrate solution are mixed in a 2,000 milliliter (ml) beaker. 100 grams 2.0 N ammonium hydroxide is slowly dripped into the solution. 530 ml of 1 M ammonium dihydrogen phosphate is added dropwise to the solution. The resulting reaction mixture is reduced in volume to about 400 ml.

A complete non-thermal reactor is immersed into the solution. The reactor is withdrawn and calcined at 725° C. for 4 hours. The resulting product is non-thermal plasma reactor with flow passages coated with $PtZr_4(PO_4)_6$.

Alternatively, about 1,000 grams of ceramic beads are immersed in the solution. The ceramic beads may be aluminum oxide, zirconium oxide, titanium oxide, and the like, as well as mixtures comprising at least one of the foregoing types of beads. The beads are withdrawn and calcined at 725° C. for 4 hours. The resulting product is non-thermal plasma reactor bed beads coated with $PtZr_4(PO_4)_6$.

Example 2

232 grams of 50 wt % zirconium n-propoxide in n-propanol and 244.7 grams of a 14.0 wt % platinum ammine nitrate solution are mixed in a 2,000 ml beaker. 100 grams 2.0 N ammonium hydroxide is slowly dripped into the solution. 530 ml of 1 M ammonium dihydrogen phosphate is added dropwise to the solution. The resulting reaction mixture is reduced in volume to about 400 ml.

A complete non-thermal reactor is immersed into the solution. The reactor is withdrawn and calcined at 725° C. for 4 hours. The resulting product is non-thermal plasma reactor with flow passages coated with $PtZr_4(PO_4)_6$.

Alternatively, about 1,000 grams of ceramic beads are immersed in the solution. The ceramic beads may be aluminum oxide, zirconium oxide, titanium oxide, and the like, as well as mixtures comprising at least one of the foregoing types of beads. The beads are withdrawn and calcined at 725° C. for 4 hours. The resulting product is non-thermal plasma reactor bed beads coated with $PtZr_4(PO_4)_6$.

Example 3

81.9 grams zirconium oxynitrate and 195.5 grams of a 10.0 wt % silver ammine nitrate solution are mixed in a 2,000 ml beaker. 100 grams 2.0 N ammonium hydroxide is slowly dripped into the solution. 530 ml of 1 M ammonium dihydrogen phosphate is added dropwise to the solution. The resulting reaction mixture is reduced in volume to about 400 ml.

A complete non-thermal reactor is immersed into the solution. The reactor is withdrawn and calcined at 725° C. for 4 hours. The resulting product is non-thermal plasma reactor with flow passages coated with $AgZr_4(PO_4)_6$.

Alternatively, about 1,000 grams of ceramic beads are immersed in the solution. The ceramic beads may be aluminum oxide, zirconium oxide, titanium oxide, and the like, as well as mixtures comprising at least one of the foregoing types of beads. The beads are withdrawn and calcined at 725° C. for 4 hours. The resulting product is non-thermal plasma reactor bed beads coated with $AgZr_4(PO_4)_6$.

Example 4

26.2 grams of titanium isopropoxide, 180.9 grams of 50 wt % zirconium n-propoxide $Zr(OC_3H_{7n})4$ in n-propanol, and 254.6 grams of a 14.0 wt % platinum ammine nitrate solution are mixed in a 2,000 ml beaker. 100 grams 2.0 N ammonium hydroxide is slowly dripped into the solution. 530 ml of 1 M ammonium dihydrogen phosphate is added dropwise to the solution. The resulting reaction mixture is reduced in volume to about 400 ml.

A complete non-thermal reactor is immersed into the solution. The reactor is withdrawn and calcined at 725° C. for 4 hours. The resulting product is non-thermal plasma reactor with flow passages coated with $PtTiZr_3(PO_4)_6$.

Alternatively, about 1,000 grams of ceramic beads are immersed in the solution. The ceramic beads may be aluminum oxide, zirconium oxide, titanium oxide, and the like, as well as mixtures comprising at least one of the foregoing types of beads. The beads are withdrawn and calcined at 725° C. for 4 hours. The resulting product is non-thermal plasma reactor bed beads coated with $PtTiZr_3(PO_4)_6$.

Example 5

19.2 grams of aluminum isopropoxide, 184.0 grams of 50 wt % zirconium n-propoxide in n-propanol, and 259.3 grams of a 14.0 wt % platinum ammine nitrate solution are mixed in a 2,000 ml beaker. 100 grams 2.0 N ammonium hydroxide is slowly dripped into the solution. 530 ml of 1 M ammonium dihydrogen phosphate is added dropwise to the solution. The resulting reaction mixture is reduced in volume to about 300 ml.

A complete non-thermal reactor is immersed into the solution. The reactor is withdrawn and calcined at 725° C. for 4 hours. The resulting product is non-thermal plasma reactor with flow passages coated with $PtAlZr_3(PO_4)_6$.

Alternatively, about 1000 grams of ceramic beads are immersed in the solution. The ceramic beads may be aluminum oxide, zirconium oxide, titanium oxide, and the like, as well as mixtures comprising at least one of the foregoing types of beads. The beads are withdrawn and calcined at 725° C. for 4 hours. The resulting product is non-thermal plasma reactor bed beads coated with PtAlZr$_3$(PO$_4$)$_6$.

Example 6

81.9 grams zirconium oxynitrate, 195.5 grams of a 10.0 wt % silver ammine nitrate and 26.8 grams of 10.0 wt % palladium ammine nitrate solution are mixed in a 2,000 ml beaker. 100 grams 2.0 N ammonium hydroxide is slowly dripped into the solution. 530 ml of 1 M ammonium dihydrogen phosphate is added dropwise to the solution. The resulting reaction mixture is reduced in volume to about 400 ml.

A complete non-thermal reactor is immersed into the solution. The reactor is withdrawn and calcined at 725° C. for 4 hours. The resulting product is non-thermal plasma reactor with flow passages coated with (Ag/Pd)Zr$_4$(PO$_4$)$_6$.

Alternatively, about 1,000 grams of ceramic beads are immersed in the solution. The ceramic beads may be aluminum oxide, zirconium oxide, titanium oxide, and the like, as well as mixtures comprising at least one of the foregoing types of beads. The beads are withdrawn and calcined at 725° C. for 4 hours. The resulting product is non-thermal plasma reactor bed beads coated with (Ag/Pd)Zr$_4$(PO$_4$)$_6$.

Example 7

81.9 grams zirconium oxynitrate and 244.7 grams of 14.0 wt % platinum ammine nitrate solution are mixed in a 2,000 ml beaker. 100 grams 2.0 N ammonium hydroxide is slowly dripped into the solution. 530 ml of 1 M ammonium dihydrogen phosphate is added dropwise to the solution. The resulting reaction mixture is reduced in volume to about 400 ml. 100 grams of 25 wt % alkaline colloidal alumina and 3.6 grams of 14.0 wt % platinum ammine nitrate solution are added to the PtZr$_4$(PO$_4$)$_6$ solution.

A complete non-thermal reactor is immersed into the solution. The reactor is withdrawn and calcined at 725° C. for 4 hours. The resulting product is non-thermal plasma reactor with flow passages coated with 80 wt % PtZr$_4$(PO$_4$)$_6$ catalyst and 20 wt % Pt/Al$_2$O$_3$ catalyst.

Alternatively, about 1,000 grams of ceramic beads are immersed in the solution. The ceramic beads may be aluminum oxide, zirconium oxide, titanium oxide, and the like, as well as mixtures comprising at least one of the foregoing types of beads. The beads are withdrawn and calcined at 725° C. for 4 hours. The resulting product is non-thermal plasma reactor bed beads coated with 80 wt % PtZr$_4$(PO$_4$)$_6$ catalyst and 20 wt % Pt/Al$_2$O$_3$ catalyst.

Example 8

81.9 grams zirconium oxynitrate and 244.7 grams of 14.0 wt % platinum ammine nitrate solution are mixed in a 2,000 ml beaker. 100 grams 2.0 N ammonium hydroxide is slowly dripped into the solution. 530 ml of 1 M ammonium dihydrogen phosphate is added dropwise to the solution. The resulting reaction mixture is reduced in volume to about 400 ml. 100 grams of 25 wt % alkaline colloidal alumina, 11.16 g barium isopropoxide and 3.6 grams of 14.0 wt % platinum ammine nitrate solution are added to the PtZr$_4$(PO$_4$)$_6$ solution.

A complete non-thermal reactor is immersed into the solution. The reactor is withdrawn and calcined at 725° C. for 4 hours. The resulting product is non-thermal plasma reactor with flow passages coated with 80 wt % PtZr$_4$(PO$_4$)$_6$ catalyst and 20 wt % Pt/Ba/Al$_2$O$_3$ catalyst.

Alternatively, about 1,000 grams of ceramic beads are immersed in the solution. The ceramic beads may be aluminum oxide, zirconium oxide, titanium oxide, and the like, as well as mixtures comprising at least one of the foregoing types of beads. The beads are withdrawn and calcined at 725° C. for 4 hours. The resulting product is non-thermal plasma reactor bed beads coated with 80 wt % PtZr$_4$(PO$_4$)$_6$ catalyst and 20 wt % Pt/Ba/Al$_2$O$_3$ catalyst.

Example 9

81.9 grams zirconium oxynitrate and 244.7 grams of 14.0 wt % platinum ammine nitrate solution are mixed in a 2000 ml beaker. 100 grams 2.0 N ammonium hydroxide is slowly dripped into the solution. 530 ml of 1 M ammonium dihydrogen phosphate is added dropwise to the solution. The resulting reaction mixture is reduced in volume to about 400 ml. 168 grams of 15 wt % alkaline colloidal tin oxide, 11.16 g barium isopropoxide, and 3.6 grams of 14.0 wt % platinum ammine nitrate solution are added to the PtZr$_4$(PO$_4$)$_6$ solution.

A complete non-thermal reactor is immersed into the solution. The reactor is withdrawn and calcined at 725° C. for 4 hours. The resulting product is non-thermal plasma reactor with flow passages coated with 80 wt % Ptzr$_4$(PO$_4$)$_6$ catalyst and 20 wt % Pt/Ba/SnO$_2$ catalyst.

Alternatively, about 1,000 grams of ceramic beads are immersed in the solution. The ceramic beads may be aluminum oxide, zirconium oxide, titanium oxide, and the like, as well as mixtures comprising at least one of the foregoing types of beads. The beads are withdrawn and calcined at 725° C. for 4 hours. The resulting product is non-thermal plasma reactor bed beads coated with 80 wt % PtZr$_4$(PO$_4$)$_6$ catalyst and 20 wt % Pt/Ba/SnO$_2$ catalyst.

Some suitable zirconium sources are zirconium dioxide, zirconium oxychloride, zirconium tert-butoxide, zirconium ethoxide, zirconium isopropoxide, colloidal zirconium oxide, and the like, as well as mixtures comprising at least one of the foregoing sources.

Some suitable phosphate sources are phosphoric acid, ammonium dihydrogen phosphate, diammonium hydrogen phosphate, triammonium phosphate, ammonium phosphate, and the like, as well as mixtures comprising at least one of the foregoing sources.

Some suitable precious metal sources are nitrates such as platinum nitrate, palladium nitrate, iridium nitrate, rhodium nitrate, ruthenium nitrate or silver nitrate, and the like, as well as mixtures comprising at least one of the foregoing sources. Chlorides such as platinum chloride, palladium chloride, iridium chloride, rhodium chloride, ruthenium chloride, silver chloride, and the like, as well as mixtures comprising at least one of the foregoing chlorides, may be employed. Amines such as platinum ammine nitrate, platinum ammine chloride, platinum ammine hydroxide, palladium ammine nitrate, palladium ammine chloride, palladium ammine hydroxide, rhodium ammine nitrate, rhodium ammine chloride, rhodium ammine hydroxide, ruthenium ammine nitrate, ruthenium ammine chloride, ruthenium ammine hydroxide, iridium ammine nitrate, iridium ammine chloride, iridium ammine hydroxide, silver ammine nitrate, silver ammine chloride, and the like, as well as mixtures comprising at least one of the foregoing ammines, may also be employed. Additionally, silver acetate, silver carbonate, silver citrate, silver oxylate, and the like, as well as mixtures comprising at least one of the foregoing, may also be used.

Some suitable titanium sources are titanium dioxide, titanium oxychloride, titanium oxynitrate, titanium isobutoxide, titanium n-butoxide, titanium tert-butoxide, titanium ethoxide, titanium isopropoxide, titanium methoxide, titanium n-propoxide, colloidal titanium oxide, and the like, as well as mixtures comprising at least one of the foregoing sources.

Some suitable aluminum sources are aluminum oxide, aluminum hydroxide, aluminum methoxide, aluminum n-butoxide, aluminum ethoxide, alkaline colloidal alumina, aluminum isopropoxide, and the like, as well as mixtures comprising at least one of the foregoing sources.

Some suitable barium sources are barium acetate, barium ethoxide, barium isopropoxide, barium 2-methoxide, barium zirconium isopropoxide, and the like, as well as mixtures comprising at least one of the foregoing.

Some suitable tin sources are tin oxide colloidal in water stabilized by NH4+, pH 9–11, tin acetate, tin ethoxide, tin isopropoxide, tin 2-methoxide, and the like, as well as mixtures comprising at least one of the foregoing sources.

Additionally directing agents such as quaternary alkylammonium ions, and the like, may be used.

Zirconium phosphate possesses the following advantageous characteristics: (1) density of about 2.83 g/cc; (2) an open porosity percentage of about 15% to about 20%; (3) a thermal conductivity value of about 6.2 BTU-in/hr-ft$^2$-° F.; (4) the ability to withstand a maximum service temperature value of about 2,800° F.; and (5) ultra high thermal shock resistance such that it can be heated or cooled at approximately 2,000° C. per minute without experiencing thermal shock. It is also resistant, under both basic and acidic conditions, to corrosive materials such as rare earth elements, alkaline earth elements, transition metal oxides, and precious metal salts, as well as compositions containing nitrogen oxides and sulfur oxides. When combined with a precious metal, the metal zirconium phosphate is particularly useful in a non-thermal plasma reactor in removing NOx from a gas stream.

A catalyst composition comprising a metal zirconium phosphate provides reduced $NO_X$ emissions by a two-stage process. Stage 1 represents the efficient and efficacious oxidation of $NO_X$ to form $NO_2$. Further reaction of $NO_2$ with HC and/or carbon soot particles will result in oxidation of the HC and/or carbon soot and reduction of $NO_2$ to form a benign gas containing $CO_2$ and $N_2$, stage 2, wherein the net effect will be a reduction in the amount of $NO_X$ in the emission gas. In addition, the catalyst composition will provide poison protection from sulfur or other anion poisons, and thermal shock resistance to the hot emission gases.

A standard catalyst of platinum on alumina lasts 0 hours in the plasma region of the nonthermal plasma reactor. The described platinum zirconium phosphate lasts for at least 25 hours, when the test was stopped. It is believed, due to the adhesion and visual observation and comparisons, the metal zirconium phosphate (e.g., platinum zirconium phosphate) on alumina plates will have about 2,000 hour or greater durability. Typical exhaust catalysts such as platinum on gamma alumina do not adhere to dense, non-porous alumina plates or beads. In contrast, the metal phosphate catalyst exhibits good adherence to alumina plates and beads, even in non-thermal plasma reactor space velocities (e.g., velocities up to about 100 times greater than a standard catalyst bed). In a rub test, alumina deposited on an alumina plate will rub off with the use of a finger, while the metal phosphate deposited on the alumina plate can not be rubbed of with a finger.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process for treating exhaust gas, comprising:
   exposing said gas to a plasma field; and
   exposing said gas to a catalyst composition comprising $MZr_4(PO_4)_6$, where M is a metal selected from the group consisting of platinum, palladium, ruthenium, rhodium, osmium, silver, iridium, and alloys and combinations comprising at least one of said foregoing metals.

2. The process of claim 1, wherein said catalyst composition further comprises 0.25 wt % to about 50 wt % of an oxidation catalyst, based upon a total weight of said catalyst composition.

3. The process of claim 2, wherein said oxidation catalyst is selected from the group consisting of platinum, palladium, ruthenium, rhodium, osmium, iridium, gold, copper, silver, titanium, aluminum, gallium, indium, tin, and oxides, alloys, salts, and mixtures comprising at least one of said foregoing oxidation catalysts.

4. The process of claim 3, further comprising exposing said gas to said $MZr_4(PO_4)_6$ prior to exposing it to said oxidation catalyst.

5. The process of claim 4, wherein said oxidation catalyst is disposed downstream from said plasma field.

6. The process of claim 1, further comprising generating said plasma field in a non-thermal plasma reactor.

7. The process of claim 6, wherein said non-thermal plasma reactor is a reactor selected from the group consisting of glow discharge reactor, RF discharge reactor, pulsed corona reactor, dielectric-barrier discharge reactor, electrified packed bed reactor, and surface discharge reactor.

8. The process of claim 7, wherein said non-thermal plasma reactor is a pulsed corona reactor.

9. The process of claim 1, wherein greater than or equal to about 66% of nitrogen oxides are removed.

10. The process of claim 9, wherein greater than or equal to about 78% of nitrogen oxides are removed.

11. The process of claim 10, wherein greater than or equal to about 90% of nitrogen oxides are removed.

12. The process of claim 1, wherein said catalyst composition further comprises about 70 wt % to about 99 wt % of said $MZr_4(PO_4)_6$ and about 1 wt % to about 30 wt % of an oxidation catalyst, based on a total weight of said catalyst composition.

13. The process of claim 12, wherein said catalyst composition further comprises about 80 wt % to 98 wt % $MZr_4(PO_4)_6$ and about 2 wt % to about 20 wt % of said oxidation catalyst, based on said total weight of said catalyst composition.

14. The process of claim 1, further comprising exposing at least a portion of said gas to a catalytic converter.

15. The process of claim 1, wherein said gas further comprises $NO_X$.

16. A gas treatment system, comprising:
    a non-thermal plasma reactor; and
    a catalyst composition disposed within said non-thermal plasma reactor, said catalyst composition comprising a $MZr_4(PO_4)_6$, wherein M is a metal selected from the group consisting of platinum, palladium, ruthenium, silver, rhodium, osmium, iridium, and combinations comprising at least one of said foregoing metals.

17. The gas treatment system of claim 16, wherein said non-thermal plasma reactor is a reactor selected from the group consisting of glow discharge reactor, RF discharge reactor, pulsed corona reactor, dielectric-barrier discharge reactor, electrified packed bed reactor, and surface discharge reactor.

18. The gas treatment system of claim 17, wherein said non-thermal plasma reactor is a pulsed corona reactor.

19. The gas treatment system of claim 16, wherein said catalyst composition further comprises an oxidation catalyst.

20. The gas treatment system of claim 19, wherein said oxidation catalyst is selected from the group consisting of platinum, palladium, ruthenium, rhodium, osmium, iridium, gold, copper, silver, titanium, aluminum, gallium, indium, tin, and oxides, alloys, salts, and mixtures comprising at least one of said foregoing oxidation catalysts.

21. The gas treatment system of claim 16, wherein said catalyst composition comprises about 70 wt % to about 99 wt % of said $MZr_4(PO_4)_6$ and further comprises about 1 wt % to about 30 wt % of an oxidation catalyst, based on a total weight of said catalyst composition.

22. The gas treatment system of claim 21, wherein said catalyst composition comprises about 80 wt % to 98 wt % of said $MZr_4(PO_4)_6$ and about 2 wt % to about 20 wt % of said oxidation catalyst, based on said total weight of said catalyst composition.

23. The gas treatment system of claim 16, further comprising a catalytic converter in fluid communication with said non-thermal plasma reactor.

24. The gas treatment system of claim 16, further comprising an oxidation catalyst in fluid communication with said non-thermal plasma reactor, wherein said oxidation catalyst is selected from the group consisting of platinum, palladium, ruthenium, rhodium, osmium, iridium, gold, copper, silver, titanium, aluminum, gallium, indium, tin, and oxides, alloys, salts, and mixtures comprising at least one of said foregoing oxidation catalysts.

* * * * *